United States Patent
Roumagnac

(10) Patent No.: US 6,626,087 B2
(45) Date of Patent: Sep. 30, 2003

(54) INSTALLATION FOR CONTINUOUS STERILIZATION OF PRODUCTS CONTAINED IN FLEXIBLE PACKAGES

(75) Inventor: Jean-Patrick Roumagnac, Le Coteau (FR)

(73) Assignee: Barriquand Steriflow, Roanne (FR)

( * ) Notice: Subject to any disclaimer, the term of this patent is extended or adjusted under 35 U.S.C. 154(b) by 0 days.

(21) Appl. No.: 10/239,119

(22) PCT Filed: Mar. 20, 2001

(86) PCT No.: PCT/FR01/00824
§ 371 (c)(1),
(2), (4) Date: Sep. 19, 2002

(87) PCT Pub. No.: WO01/70050
PCT Pub. Date: Sep. 27, 2001

(65) Prior Publication Data
US 2003/0089578 A1 May 15, 2003

(30) Foreign Application Priority Data
Mar. 20, 2000 (FR) ............................................. 00 03500

(51) Int. Cl.$^7$ ............................. A23L 1/00; A23L 3/06; A47J 27/00; A47J 27/08
(52) U.S. Cl. ............................ 99/330; 99/331; 99/355; 99/359; 99/360; 99/370; 99/371; 99/470; 99/483
(58) Field of Search .................... 99/327–331, 339, 99/340, 352–355, 359–371, 467, 468, 470, 483, 484, 443 C, 443 R, 386; 422/25, 26, 38, 104, 302, 304, 296; 426/405–407, 401, 412, 410, 521, 523, 509–511

(56) References Cited

U.S. PATENT DOCUMENTS

| | | | | |
|---|---|---|---|---|
| 3,093,449 A | * | 6/1963 | Kotarski et al. | 99/359 X |
| 3,592,550 A | * | 7/1971 | Denk | 99/330 |
| 3,613,550 A | * | 10/1971 | Thompson | 99/330 |
| 3,688,684 A | * | 9/1972 | Piedallu | 99/409 |
| 3,927,976 A | * | 12/1975 | Reimers et al. | 422/25 X |
| 4,169,408 A | * | 10/1979 | Mencacci | 99/355 |
| 4,346,650 A | | 8/1982 | Zaitsu | |
| 4,385,035 A | * | 5/1983 | Akitoshi et al. | 99/361 X |
| 4,646,629 A | * | 3/1987 | Creed et al. | 99/468 |
| 4,892,186 A | | 1/1990 | Frei | |
| 4,972,941 A | | 11/1990 | Kasik | |
| 5,245,916 A | * | 9/1993 | Elizondo et al. | 99/359 |

FOREIGN PATENT DOCUMENTS

| | | | |
|---|---|---|---|
| DE | 329475 | 11/1920 | |
| EP | 0 267 416 A2 | 10/1987 | ........... H01L/21/00 |
| EP | 0 347 623 A1 | 5/1989 | ........... A23L/3/00 |
| EP | 0 738 476 A1 | 10/1996 | ........... A23L/3/04 |
| EP | 0 753 748 A2 | 1/1997 | ........... G01N/35/04 |
| GB | 1129800 | 10/1968 | |
| JP | 05124728 | 5/1993 | ........... B65G/54/02 |
| WO | WO 98/13283 | 4/1998 | ........... B65G/54/02 |

* cited by examiner

Primary Examiner—Timothy F. Simone
(74) Attorney, Agent, or Firm—Cohen, Pontani, Lieberman & Pavane

(57) ABSTRACT

The proposed installation comprises a plurality of carriages which pass in succession from a product loading station (3) to a product unloading station (15) in succession via an inlet lock (10), a sterilizing tunnel (11), a transfer lock (12), a cooling tunnel (13), and an outlet lock (14). The superheated water of the sterilizing tunnel (11) and the cooling water of the cooling tunnel (13) are maintained at a pressure P1 greater than the pressure that exists inside the packages contained in the carriages during sterilization. The sterilizing tunnel (11) and the cooling tunnel (13) preferably constitute an assembly having an even number of superposed segments, with the carriages being caused to travel along the tunnels by linear magnetic couplers. The installation is adapted to sterilizing products contained in flexible packages.

8 Claims, 5 Drawing Sheets

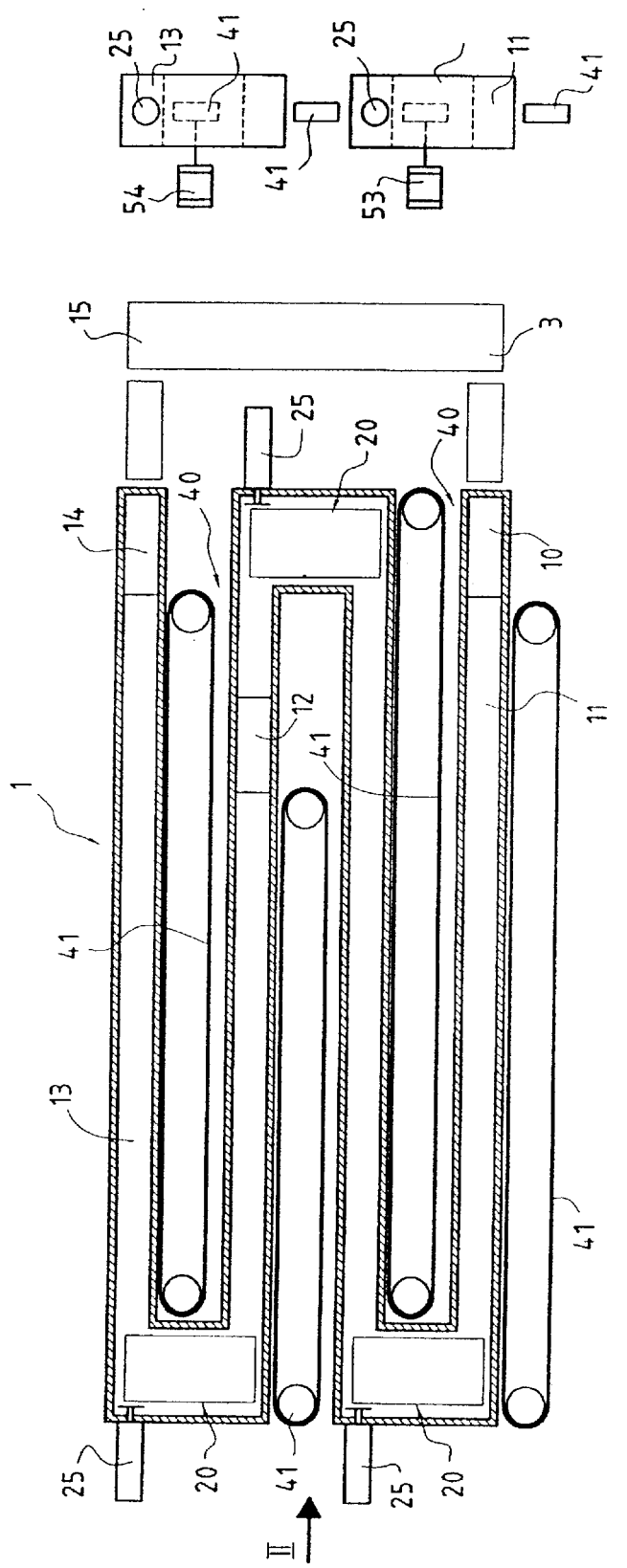

INSTALLATION FOR CONTINUOUS STERILIZATION OF PRODUCTS CONTAINED IN FLEXIBLE PACKAGES

PRIORITY CLAIM

This is a U.S. national stage of application No. PCT/FR01/00824, filed on Mar. 20, 2001. Priority is claimed on that application and on the following application: Country: France, Application No.: 00 03500, Filed: Mar. 20, 2000.

BACKGROUND OF THE INVENTION

The invention relates to an installation for continuously sterilizing food products contained in flexible packages.

Sterilizing food products contained in flexible packages requires the packages to be placed in an enclosure under pressure during the sterilization stage and during the cooling stage in order to prevent the packages bursting under the effect of the internal pressure that is generated by the rise in temperature during the treatment. This is particularly true when the product to be sterilized is contained in a flexible bag. When the products are contained in semirigid trays, U.S. Pat. No. 5,245,916 proposes a tray support which holds the edges of a tray and its capsule against internal pressure forces, and said container support is handled as though it were a rigid container, jar, or metal can. Such tray supports increase the cost of the installation and of handling, and they cannot be used for protecting flexible bags.

As a general rule, food products are sterilized continuously in tower-type sterilizers in which the products travel along up and down paths, with the pressure inside such towers increasing between end towers and a middle tower referred to as the sterilizing tower. The change in pressure between two successive towers is obtained by means of a difference in water level in the up portion of one tower and the down portion of the other tower.

Those sterilizers are adapted to products contained in rigid packages, but they are not adapted to flexible packages such as bags since such packages are subjected to large changes of pressure on being immersed in water columns of great height.

Belgian patent BE 901 695 describes treatment apparatus comprising at least one moving carriage containing a plurality of packets of products to be treated and moving around a closed loop having a plurality of successive treatment stations: a heat treatment station comprising a pressurizing chamber, a sterilizing chamber, and a decompression chamber; a cooling station for cooling the carriage and the products; a carriage-unloading station; and a carriage-loading station.

The carriage coming from the sterilizing chamber is delivered to the decompression chamber which is in the form of a lock receiving hot water at the pressure of the sterilizing chamber. The carriage remains in the decompression chamber for a short length of time only. The hot water is removed and replaced with cold water, after which the decompression chamber is put to atmospheric pressure, and the carriage together with its still-hot products is taken away to the cooling station.

The apparatus described in BE 901 695 thus enables bags to be treated during the temperature rise stage, providing the pressure which exists inside the sterilizing chamber is sufficient to counter the pressure that exists inside the bag due to the temperature rise, but at the outlet from the decompression chamber, because the products are still hot and are subjected to atmospheric pressure, that apparatus is unsuitable for treating bags since a plurality of bags might burst or become damaged at the outlet of the decompression chamber.

In BE 901 695, the carriages are moved through the locks and the sterilizing chamber by means of a wormscrew which co-operates with a stud formed on a side wall of the carriage. In addition to the wear which is inevitable in a hot atmosphere, that disposition also requires leakproof bearings for supporting the wormscrew where it passes through the end walls of the installation.

U.S. Pat. No. 4,169,408 and U.S. Pat. No. 4,646,629 disclose installations for continuously sterilizing products contained in packages placed on carriages, in which the carriages are driven stepwise through the sterilizing chamber by means of a long piston rod carrying a plurality of pusher fingers. Those installations likewise require means for sealing the bearings provided through the end walls of the sterilizing chamber and through which the piston rods slide. In addition, the pusher fingers are difficult to access during maintenance.operations.

SUMMARY OF THE INVENTION

The object of the invention is to propose a continuous sterilizing installation in which the sealing problems of the prior art are eliminated.

The invention thus provides an installation for continuously sterilizing products contained in packages, in particular flexible packages, the installation comprising:

a plurality of moving carriages suitable for moving one after another around a closed path comprising a loading station in which a batch of packages to be treated is loaded onto a carriage by loading means, and an unloading station in which a batch of treated packages is unloaded from a carriage by unloading means, said carriages passing successively between the loading station and the unloading station via:

an inlet lock suitable for receiving carriages loaded with respective batches of packages for treatment from the loading station at a predetermined rate;

a sterilizing tunnel containing superheated water at a pressure P1 greater than the pressure that is likely to exist in the packages being sterilized;

a transfer lock in which the pressure P1 subsists, said transfer lock being suitable for receiving carriages from the sterilizing tunnel at said rate;

a cooling tunnel containing cooling water at a pressure P1; and an outlet lock suitable for receiving carriages coming from the cooling tunnel at said rate, prior to delivering them to the unloading station;

means for maintaining the water in the sterilizing tunnel at the required temperature and at the pressure P1;

means for maintaining the water in the cooling tunnel at the pressure P1;

means for causing the carriages to advance from the loading station to the unloading station;

means for transferring an empty carriage from the unloading station to the loading station; and means for causing the doors of the locks to open and close synchronously with the means for causing the carriages to advance.

The installation is characterized by the fact that the sterilizing tunnel, the cooling tunnel, and the locks are made of a non-magnetic material, and the means for causing the carriages to advance inside the sterilizing tunnel and the cooling tunnel comprise linear magnetic couplers.

Advantageously, the linear magnetic couplers comprise magnetic receiver circuits mounted on the carriages and magnetic transmitter circuits mounted to move outside the tunnels.

Preferably, the transmitter magnetic circuits are carried by endless belts mounted beneath the tunnels or tunnel segments.

The tunnels and the locks are thus free from any mechanical devices for moving the carriages. This greatly simplifies maintenance of the installation.

In addition, during treatment of the products, i.e. during sterilization and cooling, the packages are subjected to the same pressure P1 greater than the pressure that is liable to exist inside the packages during sterilization. It is only on leaving the outlet lock, once the products are cold, that the packages are subjected to atmospheric pressure.

There is thus no danger of the packages bursting due to excess internal pressure.

To reduce the floor area occupied by the installation, the path through the sterilizing tunnel and the cooling tunnel comprises an even number of superposed path segments, means being provided for transferring carriages vertically from a lower path segment towards the next higher path segment. The unloading station is situated immediately above the loading station. The means for transferring a carriage from a lower segment to a higher segment comprise an elevator device for raising a carriage, and a thrust actuator for transferring the carriage from the elevator device to the beginning of the higher path segment.

It is also preferable to adopt the following advantageous provisions:

the superheated water circulates in the sterilizing tunnel in the opposite direction to the direction in which the carriages advance and is supplied by a water heater device, and is maintained therein at the pressure P1 by the presence of a first hydropneumatic accumulator connected to a source of compressed air and mounted on the sterilizing tunnel; and the cooling water circulates in the cooling tunnel in a direction opposite to the travel direction of the carriages and is maintained at the pressure P1 therein by the presence of a second hydropneumatic accumulator connected to a source of compressed air and mounted on the cooling tunnel.

BRIEF DESCRIPTION OF THE DRAWINGS

Other advantages and characteristics of the invention appear on reading the following description given by way of non-limiting example and made with reference to the accompanying drawings, in which:

FIG. 1 is a diagrammatic section on a vertical plane through a sterilization installation of the present invention;

FIG. 2 is a view of the sterilization installation seen looking along arrow II of FIG. 1;

DETAILED DESCRIPTION OF THE PRESENTLY PREFERRED EMBODIMENTS

Figure 3:
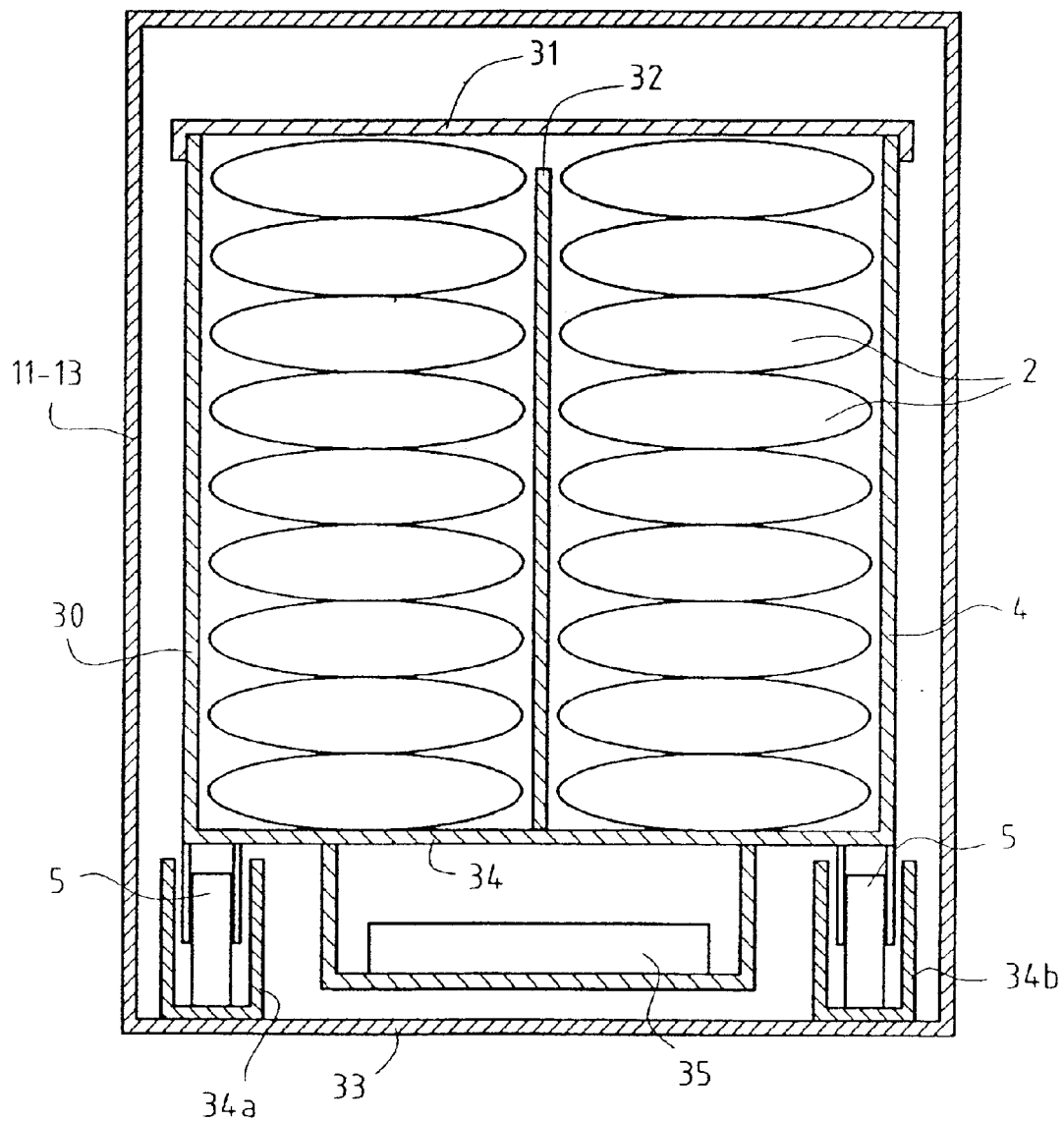
FIG. 3 is a cross-section through a carriage placed in the sterilizing tunnel.

The drawings show an installation 1 for continuously sterilizing food products contained in flexible packages 2, e.g. bags. In a loading station 3, conventional loading means load the packages 2 into a carriage 4 running on wheels 5.

Once loaded, the carriage 4 is inserted through an inlet lock 10 situated immediately upstream of a sterilizing tunnel 11 containing water superheated to the required temperature and at a pressure P1 that depends directly on the treatment temperature, which pressure is 3.5 bars, for example, when the treatment temperature is 126° C. Thereafter, the carriage 4 travels along the sterilizing tunnel 1 which is separated from a cooling tunnel 13 containing cooling water at pressure P1 by means of a transfer lock 12. The mean travel speed of the carriage 4 along the sterilizing tunnel, and the length of the tunnel 11 are determined in such a manner that the products contained in the carriages 4 are subjected to effective sterilization. The mean speed can be adjusted depending on the duration of heat treatment and the rate of throughput. By way of example, the mean speed can be 1 meter per minute (m/min) and the length of the sterilizing tunnel can be 25 meters (m), for example. The sterilizing tunnel contains a plurality of carriages 4 placed one after another.

When the carriage 4 reaches the downstream end of the sterilizing tunnel 11, it enters into the transfer lock 12, and then into the cooling tunnel 13 which is of a length that is sufficient to ensure that the packages 2 contained in the carriage 4 have cooled down completely once the carriage reaches the downstream end of the cooling tunnel 13. An outlet lock 14 is provided at the downstream end of the cooling tunnel 13. On leaving the lock 14, the carriage 4 is transferred to an unloading station 15, and then the empty carriage 4 is transferred back to the loading station 3.

During this cycle, which may last for 65 min, the carriage 4 moves along a closed path that is substantially horizontal.

In order to reduce the floor area occupied by the installation 1, the path followed by the carriage 4 through the locks 10, 12, and 14, and through the tunnels 11 and 13, is subdivided into an even number of parallel path segments that are superposed, and the unloading station 15 is situated above the loading station 3.

Vertical transfer devices 20 for transferring the carriages 4 are provided at the downstream end of each lower path segment to transfer a carriage 4 to the upstream end of the next higher path segment, the terms "upstream" and "downstream" being defined relative to the travel direction of the carriages 4.

A carriage 4 is generally in the form of a rectangular block, comprising a vessel 30 fitted with wheels 5 and preferably made of perforated sheets of stainless steel, optionally having a cover 31. The vessel 30 also has longitudinal partitions 32 and, where necessary, transverse partitions for separating columns of packages in order to subdivide the inside of the vessel 30 into compartments in which the flexible packages 2 are stacked. By way of example, the length of the carriage 4 is 90 centimeters (cm) with its height and width matching the dimensions of the tunnels 11 and 13.

As shown in FIG. 3, each tunnel segment is substantially rectangular in section, of width equal to 22 cm and height equal to 30 cm, for example. Under such circumstances, the width of a carriage is restricted to 20 cm and its height to 25 cm, approximately.

The tunnel segments are preferably made of non-magnetic stainless steel using sheets of a thickness that is sufficient to withstand a pressure of 4 bars.

The bottom wall 33 of each tunnel segment is fitted with two channel-section guide rails 34a, 34b forming running tracks for the wheels 5 of the carriages 4.

At least one magnetic receiver circuit 35 is fixed beneath the bottom 34 of the vessel 30 of each carriage 4 for a purpose that is described below.

Two adjacent tunnel segments are separated by a vertical space 40, as can be seen in FIG. 1, in which there is received an endless belt 41 fitted with magnetic transmitter circuits 42 (visible in FIG. 5) for co-operating with the magnetic receiver circuits 35 of the carriages 4 contained in the tunnel segments situated immediately above the belt 41. An endless belt or chain 41 is also positioned beneath the bottom segment.

The belts 41 are driven by motors (not shown in the drawings) so that the top strand 41a of each belt 41 moves in the normal travel direction of the carriages 4 at an average speed close to 1 m/min, thereby driving the carriages 4 so as to move along the corresponding tunnel segments.

The belts 41 thus constitute the means for driving the carriages 4 inside the tunnels 11 and 13. Since they are placed outside the tunnels 11 and 13, they are quite easy to maintain. The belts 41 can be driven continuously or stepwise, but they should be driven synchronously with the devices 20 for transferring the carriages 4 vertically and with the devices for opening and closing the doors of the locks 10, 11, and 12.

Figure 5:
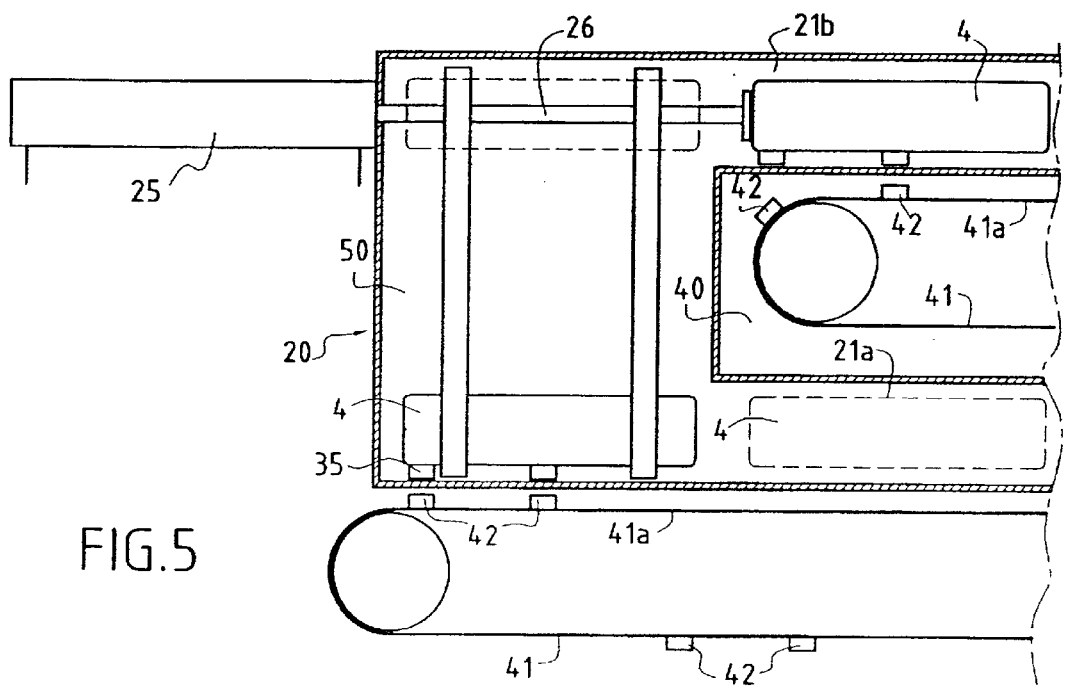
FIG. 5 is a diagrammatic section through the device for transferring a carriage from a lower path segment to a higher path segment.
Figure 6:
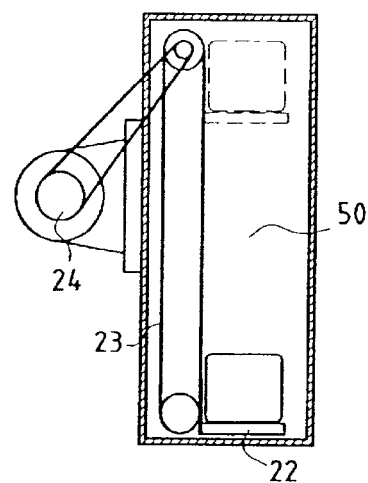
FIG. 6 shows a detail of the FIG. 5 transfer device.

FIGS. 5 and 6 show details of a device 20 for vertically transferring a carriage 4 from a bottom tunnel segment referenced 21a to a tunnel segment located immediately above it and referenced 21b. The device 20 is disposed in a chamber 50 that is permanently in communication both with the bottom segment 21a and with the top segment 21b, and of horizontal section that is adapted to accommodate the dimensions of a carriage 4. The device essentially comprises a shelf 22 fixed to an endless chain 23 driven with reciprocating up and down motion by a motor 24 situated outside the chamber 20. When the shelf 22 is in its low position, a carriage 4 moves from the bottom segment 21a into the chamber 50 and with continuing rotation of the bottom belt 41 it takes up a position on the shelf 22. The shelf 22 together with its load is moved upwards inside the chamber 50 under drive from the motor 24 until the carriage 4 is level with the higher segment 21b. In this position, an actuator 25 is actuated to transfer the carriage 4 into the higher segment 21b.

The carriage 4 is then moved by the upper belt 41, the rod 26 of the actuator 25 is retracted, and the shelf 22 returns to its low position where it is ready to receive the next carriage 4.

The locks 10, 12, and 14 are of section similar to that of the tunnels 11 and 13 and of length that is sufficient to receive a carriage 4 while it is being transferred. The locks have inlet and outlet doors of the guillotine type actuated at a predetermined rate, synchronously with displacement of the belts 41 and with the displacement of the devices 20 for transferring the carriages 4 vertically by conventional means such as actuators.

Figure 4:
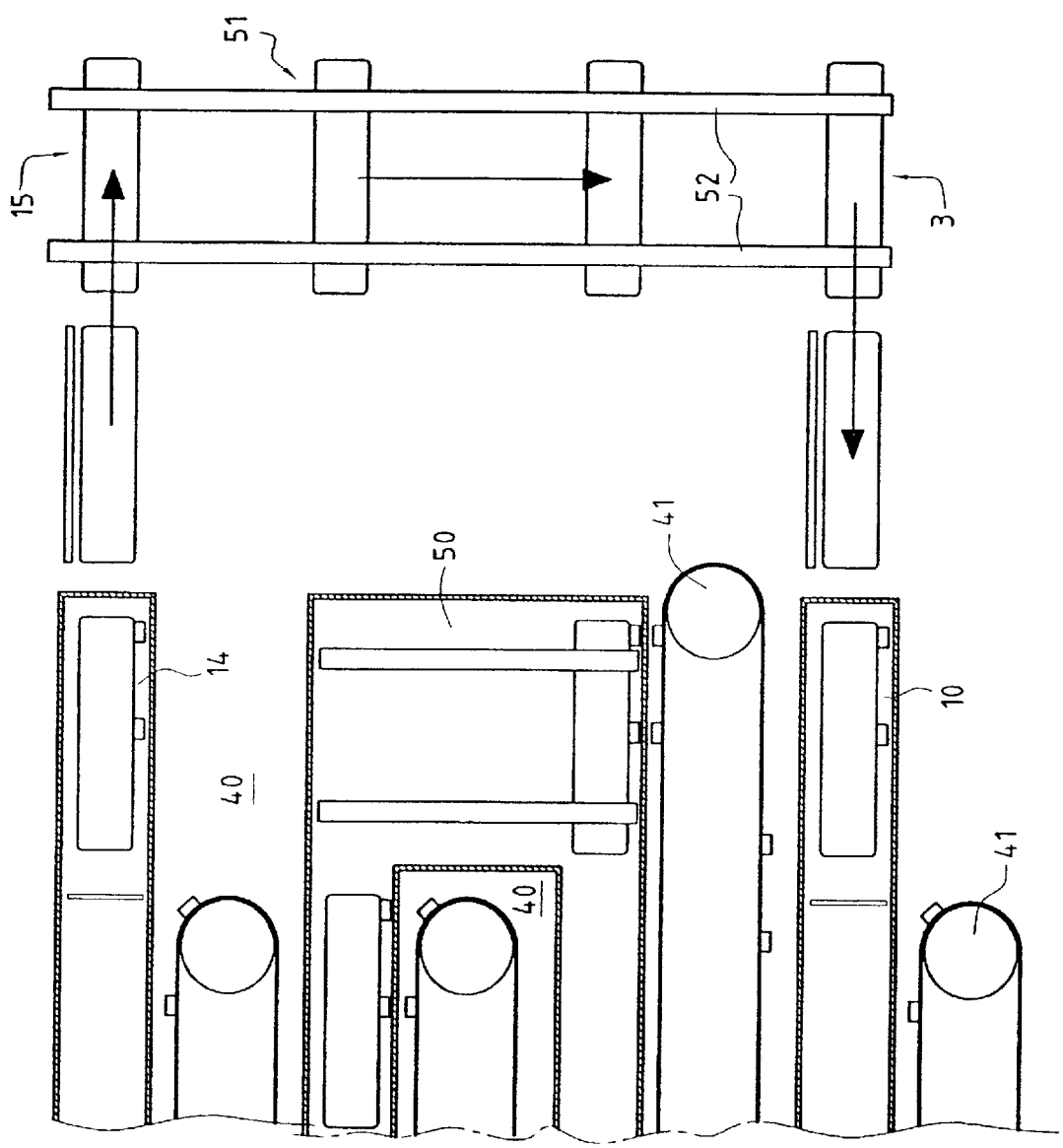
FIG. 4 is a side view in elevation of one end of the installation showing the stations for loading and unloading carriages.

FIG. 4 shows the device 51 for transferring empty carriages 4 from the unloading station 15 to the loading station 3. This device 51 comprises an endless chain 52 fitted with horizontal shelves that move vertically stepwise between the unloading station 15 and the loading station 3. A feed conveyor 53 for delivering flexible packages 2 for treatment is placed beside the loading station 3.

A removal conveyor 54 for removing treated flexible packages 2 is located beside the unloading station 5. When the carriages 4 have covers 31, a cover transfer device is located close to the stations 3 and 15 and the locks 10 and 14.

Figure 7:
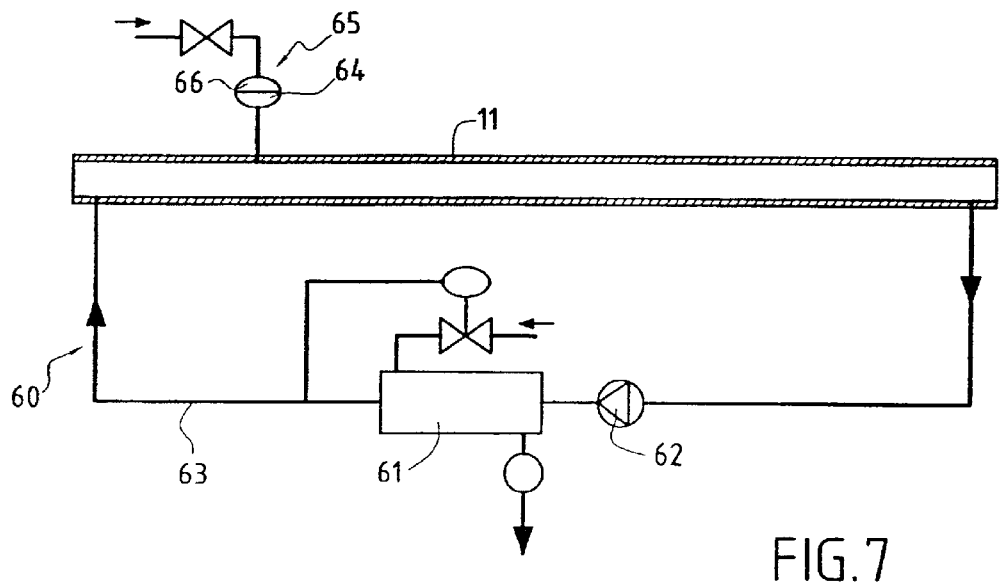
FIG. 7 shows the superheated water loop of the sterilizing tunnel.

FIG. 7 shows the superheated water loop 60. This loop 60 comprises means 61 for heating water taken from the upstream end of the sterilizing tunnel 11 by means of a pump 62 and delivered to the downstream end of the sterilizing tunnel 11 by a pipe 63.

Any loss of water which may occur when operating the doors of the inlet and transfer locks 10 and 12 are compensated by taking cold water from the general water supply network on site. In order to maintain the pressure of water inside the sterilizing tunnel at a constant value P1 higher than the pressure that might exist inside a flexible package 2 while it is being sterilized, the inside of the sterilizing tunnel is connected to the bottom chamber 64 of a hydropneumatic accumulator 65 whose top chamber 66 is connected to a source of air at the pressure P1, the two chambers 64 and 66 optionally being separated by an elastic diaphragm. Inside the sterilizing tunnel 11, the superheated water flows in the opposite direction to the direction in which the carriages 4 move.

Figure 8:
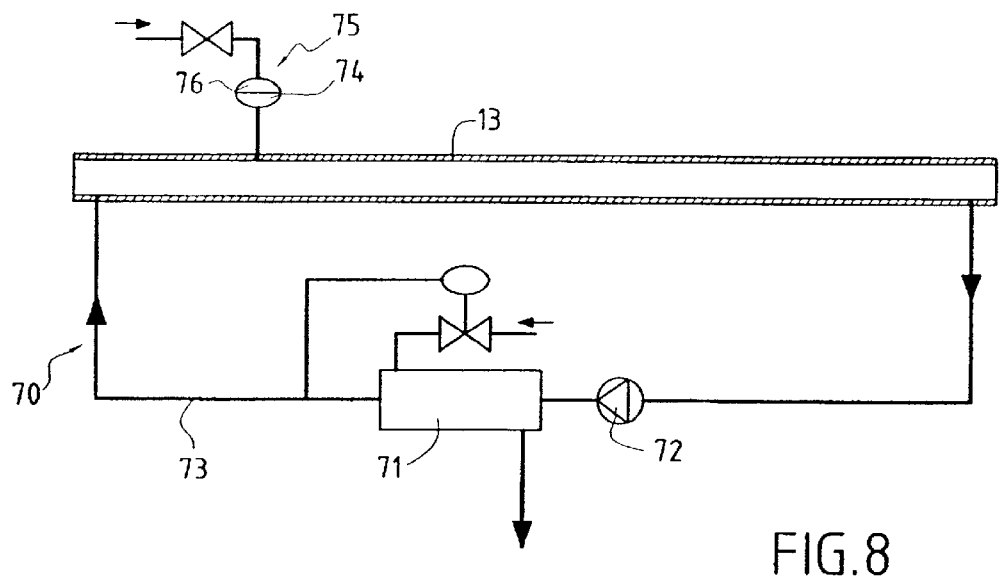
FIG. 8 shows the cooling water loop of the cooling tunnel.

FIG. 8 shows the cold water loop 70. The cooling water is circulated around the loop 70 by a pump 72 which takes water from the upstream end of the cooling tunnel 13 and delivers it to the downstream end of the tunnel 13 via a pipe 73 after causing it to pass through a heat exchanger 71. As for the superheated water loop 60, any losses of cold water from the transfer lock 12 or the outlet lock 14 are compensated by taking cold water from the general water supply on site.

The inside of the cooling tunnel 13 is continuously in communication with the bottom chamber 74 of a hydropneumatic accumulator whose top chamber 76 is connected to a source of air compressed to the pressure P1. The cooling water flows along the cooling tunnel 13 as a countercurrent to the travel direction of the carriages 4.

In the above-described embodiment, the carriages are fitted with wheels. Such carriages could be replaced by baskets having no wheels, in which case the tunnels 11 and 13 should be fitted with rolling rails.

What is claimed is:

1. An installation for continuously sterilizing products contained in packages (2), in particular flexible packages, the installation comprising:

a plurality of moving carriages (4) suitable for moving one after another around a closed path comprising a loading station (3) in which a batch of packages (2) to be treated is loaded onto a carriage (4) by loading means, and an unloading station (15) in which a batch of treated packages (2) is unloaded from a carriage by unloading means, said carriages (4) passing successively between the loading station (3) and the unloading station (15) via:

an inlet lock (10) suitable for receiving carriages (4) loaded with respective batches of packages for treatment from the loading station (3) at a predetermined rate;

a sterilizing tunnel (11) containing superheated water at a predetermined pressure greater than the pressure that is likely to exist in the packages (2) being sterilized;

a transfer lock (12) in which said predetermined pressure subsists, said transfer lock being suitable for receiving carriages (4) from the sterilizing tunnel (11) at said rate;

a cooling tunnel (13) containing cooling water at said predetermined pressure; and an outlet lock (14) suitable for receiving carriages (4) coming from the cooling tunnel at said rate, prior to delivering them to the unloading station (15);

means for maintaining the water in the sterilizing tunnel (11) at the required temperature and at said predetermined pressure;

means for maintaining the water in the cooling tunnel (13) at said predetermined pressure;

means for causing the carriages to advance from the loading station (3) to the unloading station (15);

means for transferring an empty carriage (4) from the unloading station (15) to the loading station (3); and means for causing the doors of the locks (10, 12, 14) to open and close synchronously with the means for causing the carriages (4) to advance;

the installation being characterized by the fact that the sterilizing tunnel (11), the cooling tunnel (13), and the locks (10, 12, 14) are made of a non-magnetic material, and the means for causing the carriages (4) to advance inside the sterilizing tunnel (11) and the cooling tunnel (13) comprise linear magnetic couplers (35, 42).

2. An installation according to claim 1, characterized by the fact that the linear magnetic couplers comprise magnetic receiver circuits (35) mounted on the carriages (4) and magnetic transmitter circuits (42) mounted to move outside the tunnels.

3. An installation according to claim 2, characterized by the fact that the transmitter magnetic circuits are carried by endless belts mounted beneath the tunnels or tunnel segments (21a, 21b).

4. An installation according to claim 1, characterized by the fact that the path through the sterilizing tunnel (11) and the cooling tunnel (13) comprises an even number of superposed path segments (21a, 21b), means (20) being provided for transferring carriages (4) vertically from a lower path segment (21a) towards the next higher path segment (21b).

5. An installation according to claim 4, characterized by the fact that the unloading station (15) is situated above the loading station (3).

6. An installation according to claim 4, characterized by the fact that the means for transferring a carriage from a lower segment (21a) to a higher segment (21b) comprise an elevator device (22, 23, 24) for raising a carriage, and a thrust actuator (25, 26) for transferring the carriage (4) from the elevator device to the beginning of the higher path segment (21b).

7. An installation according to claim 1, characterized by the fact that the superheated water circulates in the sterilizing tunnel (11) in the opposite direction to the direction in which the carriages (4) advance and is supplied by a water heater device (61, 62), and is maintained therein at said predetermined pressure by the presence of a first hydropneumatic accumulator (65) connected to a source of compressed air and mounted on the sterilizing tunnel (11).

8. An installation according to claim 1, characterized by the fact that the cooling water circulates in the cooling tunnel (13) in a direction opposite to the travel direction of the carriages (4) and is maintained at said predetermined pressure therein by the presence of a second hydropneumatic accumulator (75) connected to a source of compressed air and mounted on the cooling tunnel (13).

\* \* \* \* \*